(12) United States Patent
Rotithor et al.

(10) Patent No.: US 7,350,030 B2
(45) Date of Patent: Mar. 25, 2008

(54) HIGH PERFORMANCE CHIPSET PREFETCHER FOR INTERLEAVED CHANNELS

(75) Inventors: Hemant G. Rotithor, Hillsboro, OR (US); Abhishek Singhal, Beaverton, OR (US); Randy B. Osborne, Beaverton, OR (US); Zohar Bogin, Folsom, CA (US); Raul N. Gutierrez, Elk Grove, CA (US); Buderya S. Acharya, El Dorado Hills, CA (US); Surya Kareenahalli, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 11/172,401

(22) Filed: Jun. 29, 2005

(65) Prior Publication Data
US 2007/0005934 A1    Jan. 4, 2007

(51) Int. Cl.
*G06F 12/00* (2006.01)
*G06F 9/00* (2006.01)

(52) U.S. Cl. .................. 711/137; 711/118; 711/122; 711/100; 712/205; 712/206

(58) Field of Classification Search ........... 711/137, 711/100, 118, 122; 712/205, 206, 207
See application file for complete search history.

(56) References Cited

U.S. PATENT DOCUMENTS 6,085,287 A * 7/2000 O'Neil et al. ............. 711/113

6,983,356 B2    1/2006  Rotithor
2004/0221111 A1 * 11/2004 Phelps et al. ............. 711/137

OTHER PUBLICATIONS

Zhang et al., "Hardware Only Stream Prefetching and Dynamic Access Ordering", ICS 2000.*
Alexander et al., "Disrtributed Prefetch-Buffer /Cache Design for High Performance memory Systems", In Proc. of the 2nd Intl. Symp. on High-Performance Comp. Arch., 1996.*
Wei-Fen Lin et al.; Reducing DRAM latencies with an Integrated Memory Hierarchy Design; International Symposium on High-Performance computer Architecture; Jan. 2001; 12 Pages.

* cited by examiner

*Primary Examiner*—Kimberly McLean
(74) *Attorney, Agent, or Firm*—Philip A. Pedigo

(57) ABSTRACT

The invention comprises an apparatus and method of prefetching from a memory device having interleaved channels. The chipset prefetcher comprises a stride detector to detect a stride in a stream, a prefetch injector to insert prefetches onto the memory device, a channel mapper to map the prefetches to each channel of the memory device, a scheduler to schedule the prefetches onto the memory device in a DRAM-state aware manner, a throttling heuristic to scale the number of prefetches, and a prefetch data buffer to store prefetch data. The method of prefetching comprises tracking the state of streams, detecting a stride on one of the streams, selecting the stream with the stride for prefetch injection, enqueueing prefetches from the selected stream, mapping the prefetches to each of the interleaved channels, injecting the prefetches from the selected stream into each of the interleaved channels, and scheduling the prefetches onto the memory device in a DRAM-state aware manner.

10 Claims, 2 Drawing Sheets

HIGH PERFORMANCE CHIPSET PREFETCHER FOR INTERLEAVED CHANNELS

BACKGROUND OF THE INVENTION

1. Field of the Invention

The invention relates generally to chipset prefetchers and, more particularly, to an apparatus and a method of prefetching from a memory device having interleaved channels that detects workload strides and intelligently injects prefetches without incurring additional page misses.

2. Description of the Related Art

A PC platform typically consists of one or more central processing units (CPUs) connected to a chipset via high speed interconnect (typically Front Side Bus or FSB). The chipset contains a memory controller for interfacing to main memory comprised of dynamic random access memory (DRAM). If a page miss occurs during DRAM operations, the open page must first be written back to memory (precharged). Then, the new memory page has to be opened before a READ/WRITE operation (activate). Precharge and activate operations take time and slow down memory accesses, resulting in an inefficient use of the memory bus (reduced bandwidth) and a loss in performance of the device employing DRAM.

System performance may be enhanced and effective memory access latency may be reduced by anticipating the needs of a processor. If data needed by a processor in the near future is predicted, then this data can be fetched in advance or "prefetched", such that the data is buffered/cached and available to the processor with low latency. A prefetcher that accurately predicts a READ request and issues it in advance of an actual READ can thus, significantly improve system performance.

A prefetcher can be implemented in CPU or in chipset, and prefetching schemes have been routinely used on the CPU side. However, typical interconnect between CPU(s) and the chipset does not have a provision for either the CPU to share workload information with the chipset or for the chipset to share DRAM state (open/close pages) information with the CPU. Thus, a prefetcher implemented on the CPU side is limited in its ability to intelligently issue prefetches based on accurate DRAM state. This can be a significant performance constraint. On the other hand, with some additional hardware, the chipset can detect the workload strides that are important from a performance perspective. As a result, the chipset prefetcher can provide significant performance gain for applications that have a high bandwidth, a high page miss rate, and a predictable READ transaction access pattern by issuing prefetch requests in a DRAM state aware manner. Performance gain is a result of reduced DRAM page misses and lower latency of loads that hit the prefetch buffer.

W. Lin, S. Reinhardt, and D. Burger, in the paper "Reducing DRAM Latencies with an Integrated Memory Hierarchy Design," Proc., 7th International Symposium on High-Performance Computer Architecture, January 2001, offered a proposal where CPU prefetches are sent to a Level 2 (L2) cache. This scheme prefetches blocks of data that are spatially near the address of recent demand misses into the L2 cache only when the memory channel is idle and a DRAM page is opened. That is, a CPU prefetcher attempts to prefetch a wide range of addresses around a demand miss when the memory channel (and system) is idle and a page is opened. However, prefetching into a L2 cache may pollute the L2 cache with prefetched data and may give poor performance if the prefetched data is not used and the line evicted because of the prefetch is required in the future.

Prefetch performance may vary depending on whether prefetching is implemented in a lock step or in an interleaved channel memory system. Some key features of a lock step channel memory system include: (1) each channel works on the same cache line address; (2) each channel works on part of the cache line data for the address; (3) channels progress on READ/WRITE commands in lock step; and (4) the page table state is the same for each channel. On the other hand, some key features of an interleaved channel memory system include: (1) the access address is mapped to the different channels by a mapping function; (2) each channel works on a different address; (3) each channel may progress at different rates on processing their accesses; and (4) the page table state may be different for each channel. A prefetcher for lock step memory system has been described in U.S. Patent Application Publication 2004/0123043 A1.

Interleaved channels have performance advantages over lock step channels. For example, interleaved channels can process back-to-back DRAM page misses in parallel and overlap page miss latency over a longer burst length. However, prefetching in an interleaved channel memory system presents some challenges. Since each access address is mapped to a different channel, interleaved channels may present a challenge to stride detection possibilities because of potential non-linear channel address mapping. In addition, since DRAM state aware prefetching typically issues prefetches that are page hits and page table state may be different for each channel, some prefetches may be rejected in some (but not all) interleaved channels. Finally, since each channel schedules its DRAM commands independently for demands and prefetches, based on the scheduling policy, prefetches within each channel may progress at different rates.

In light of above, what is needed is a chipset prefetcher and method that works with a memory controller with interleaved memory channels that detects workload strides and intelligently injects prefetches without incurring additional page misses.

GLOSSARY OF TERMS

The following is a brief glossary of terms used herein. The supplied definitions are applicable throughout the specification and the claims, unless the term is clearly used in another manner.

CPU DEMAND READs: All READs from the CPU, including demand READs and CPU prefetches.

DRAM "PAGE HIT" OR "PAGE OPEN": indicates the memory being accessed has already been precharged and activated, and data may be read or written from the page without having to precharge or activate the memory during each memory access.

DRAM "PAGE MISS": occurs when data is accessed from a bank in memory other than from the page that is open. If a "page miss" occurs, the open page must be closed first. Then, the new memory page has to be opened before being accessed.

DRAM "PAGE EMPTY": occurs when data is accessed from a bank in memory that does not have any open page. If a "page empty" occurs, then the target memory page has to be activated before being accessed.

STREAM: A range of spatially contiguous addresses, typically a DRAM page wide.

STRIDE: A sequence of requests that has an observable pattern in addresses. Consecutive addresses spaced by increasing cache line size have a positive stride of +1. Similarly, addresses spaced by decreasing cache line size have a negative stride of −1. Strides can also be spaced by multiple cache line sizes, in which case the strides will be described to be of length +/−d where "d" is the number of cache lines.

STRIDE PREFETCHER: A conventional type of prefetcher that anticipates the needs of a processor by examining the addresses of data requested by the processor—i.e., a "demand load"—to determine if the requested addresses exhibit a regular pattern. If the processor (or an application executing thereon) is stepping through memory using a constant offset from address to address—i.e., a constant stride—the stride prefetcher attempts to recognize this constant stride and prefetch data according to this recognizable pattern.

BRIEF DESCRIPTION OF THE DRAWINGS

The above and other features and advantages of embodiments of the invention will become apparent by reference to the following detailed description when considered in conjunction with the accompanying drawings.

DETAILED DESCRIPTION OF THE EMBODIMENTS

The invention will be described below with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
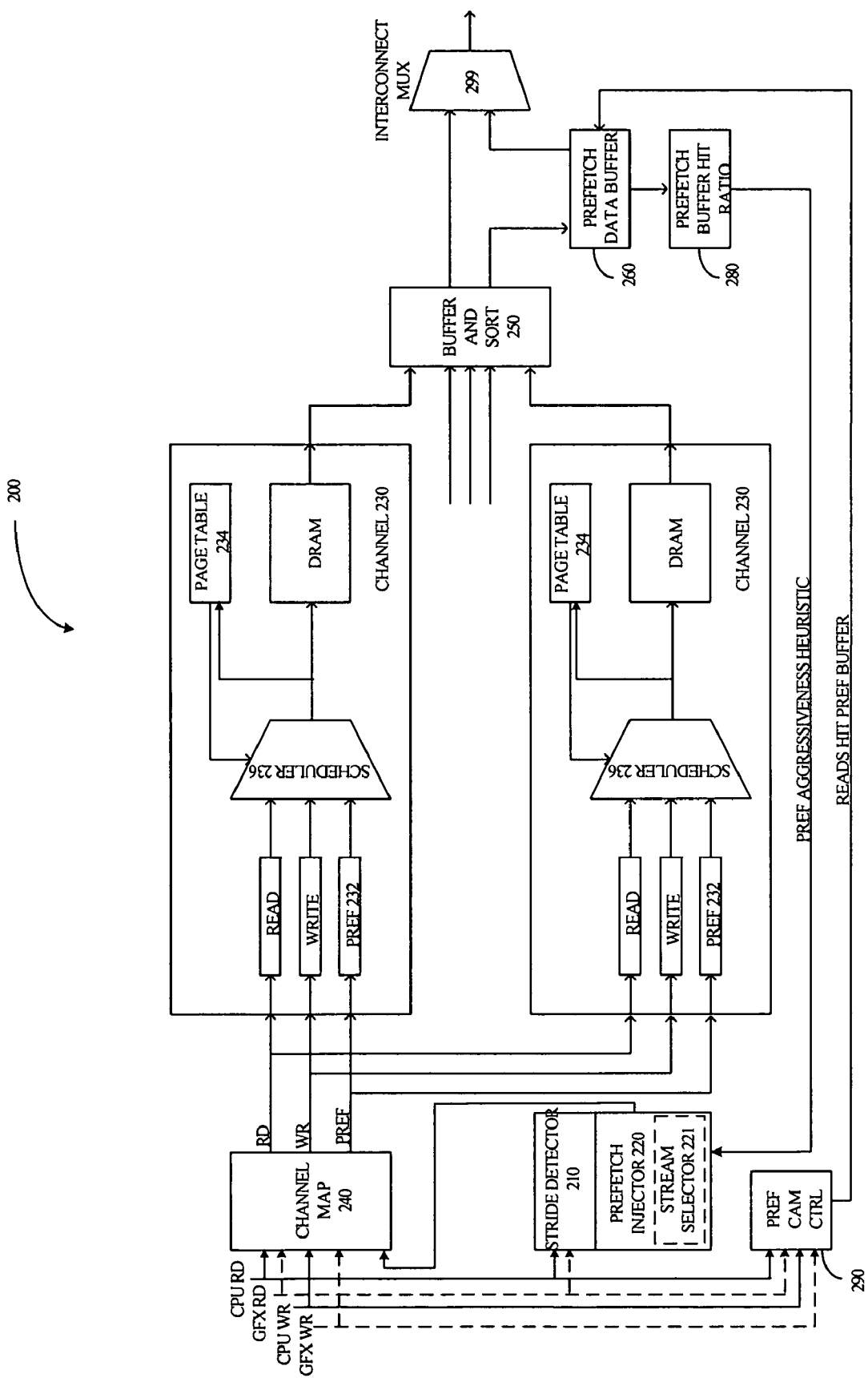
FIG. 1 is a chipset prefetcher for a memory device having interleaved channels, according to one embodiment of the invention.

FIG. 1 illustrates a memory device (DRAM)-state aware prefetcher 200 according to an embodiment of the invention. The prefetcher 200 intelligently injects prefetches without incurring additional page misses. For effective prefetching to take place, the prefetcher 200:

(1) identifies READ access patterns (memory accesses spaced uniformly in address space) with a high degree of accuracy;

(2) injects prefetches aggressively into the memory controller for those stream(s) that have a stride established;

(3) schedules prefetches in a DRAM-state aware manner and without affecting latency of demand READs adversely;

(4) monitors the efficiency of prediction and prefetching by monitoring the hit rate of the prefetches injected; and (5) scales the number of prefetches injected based on the prefetch hit rate and, possibly, memory bandwidth utilization rate, to prevent adverse effects on applications for which prefetching is not working efficiently.

The prefetcher 200 works with a memory controller with interleaved memory channels. With interleaved channels, the prefetcher 200 can be designed in several ways. Architectures of the prefetcher 200 may include: per channel or a common stride detector; per channel or a common prefetch injector; per channel or a common prefetch throttling heuristic; and per channel or a common prefetch data buffer and CAM logic. Embodiments of the prefetcher 200 may utilize different combinations of the per channel and common elements. For simplification, however, only one embodiment will be discussed. In the embodiment shown in FIG. 1, the DRAM-state aware prefetcher 200 comprises a common stride detector 210, a common prefetch injector 220, a common throttling heuristic, and common prefetch data buffer 260. The functions of these elements are described below.

At any given time, the prefetcher tracks the state of a finite number of streams. Requests (from CPU, graphics, or any other source) that enter the memory controller are mapped into the available DRAM channels 230. In one embodiment, prefetches may be limited to one source, e.g., CPU only. However, depending on the number of interleaved channels in the system, there may be a non-linear demand READ address to channel mapping function. Thus, it may be difficult to detect a stride after the channel mapping is done even if the original stream had a stride present. Therefore, the stride detector 210 detects the stride on the input stream before the address of the demand READ is mapped to individual channels 230 (common stride detector). Any suitable stride detection algorithm may be utilized. In one embodiment, a stride is considered to be established if the stride detector 210 recognizes "n" contiguous accesses (in either positive or negative direction) within the stream.

Figure 2:
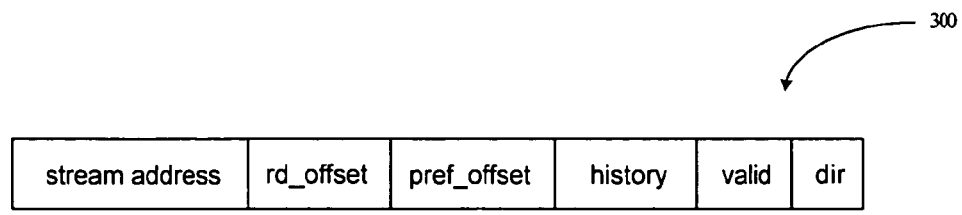
FIG. 2 is a format of a stream tracker table according to one embodiment of the invention.

The stride detector 210 detects strides by keeping a history of accesses per stream within a region in a stream tracker table 300, as shown in FIG. 2. The stream tracker table 300 comprises, but is not limited to, the following parameters:

stream_address: page (typically dram page) aligned address of stream rd_offset: offset from stream address of last demand READ pref_offset: offset from stream address of last prefetch issued (shared by channels)

history: history of last 'n' demand READs to track address pattern valid: whether a stride has been detected on this stream dir: direction of stride with respect to last access (positive or negative)

Referring back to FIG. 1, when the stride detector 210 detects a stride in a stream, the prefetch injector 220 injects one prefetch per clock per channel, and the channel map 240 maps the prefetches to the various channel prefetch queues 232. For good prefetch performance and balanced DRAM channel bandwidth, prefetches are injected per channel. That is, prefetch injection is done independently, into the prefetch request queue 232 of each of the interleaved channels 230. Because of the centralized stream stride detector 210, it is easier to inject and track prefetches for a stream that has a stride from the detector 210 rather than within the channel 230.

The prefetch injector 220 uses stride detector 210 and a stream selector 221 in making decisions. As shown in FIG. 1, stream selection is decoupled from prefetch scheduling in the channel 230. The decoupling of the stream selector 221 and the scheduler 236 allows DRAM state to be maintained on a per channel basis (and not at the stream selection/injection logic).

The stream selector 221 selects a stream from among the established streams with a stride and en-queues prefetches from the selected stream for scheduling to the DRAM. Stream selection, according to one embodiment of the invention, may be implemented using a round-robin policy. The prefetch injector 220 inserts prefetches from the selected stream into the prefetch queue 232 of each channel 230. The scheduler 236 selects one of the prefetches to be scheduled onto the memory device in a DRAM-state aware manner. That is, prefetches are scheduled based on the state of the DRAM page table 234 (i.e., only prefetches to open pages are scheduled). However, when an injected prefetch is inserted into the channel prefetch queue 232, it does not have to be immediately accepted by the channel scheduler 236. The injected prefetch stays in the channel prefetch queue 232 until it is accepted by the channel scheduler 236 or until it gets replaced (dropped) by another injected prefetch (lazy rejection). If the channel prefetch queue 232 is full, the oldest injected prefetch that is not a page hit is replaced. If the prefetches in a specific channel get replaced, there may be prefetch holes in a stream of prefetches for a particular stream; however, dropped prefetches are not re-injected. At the time a prefetch is injected in a channel 230, an entry is reserved in the prefetch data buffer 260 and content-addressable memory (CAM) for that prefetch.

Each demand READ updates the history and offset information in the stream tracker table 300. If there is a hit for READ (result of PREFETCH Data CAM match), data is returned from the prefetch data buffer 260. Otherwise, the READ is scheduled to receive its data from the DRAM. Prefetch data buffer has a lower latency of access than a DRAM access. DRAM services both PREFETCH and READ requests. In the case of PREFETCH, data return has two possibilities. If there is already a pending READ request for the PREFETCH, the data is sent directly to the multiplexer 299 by buffer and sort 250. Otherwise, PREFETCH data is sent to be stored in prefetch data buffer 260. Data for READs which do not have PREFETCH hits is also sent directly to the multiplexer 299. The multiplexer 299 selects data returning from either prefetch buffer 260 or DRAM to the interconnect.

As mentioned above, the prefetcher 200 schedules prefetches in a DRAM-state aware manner and without affecting latency of demand READs adversely. Demand requests generally should be accorded the highest priority, as a demand request corresponds to data currently needed by the CPU. Prefetch requests are generally accorded a priority lower than that of demand requests.

Figure 3:
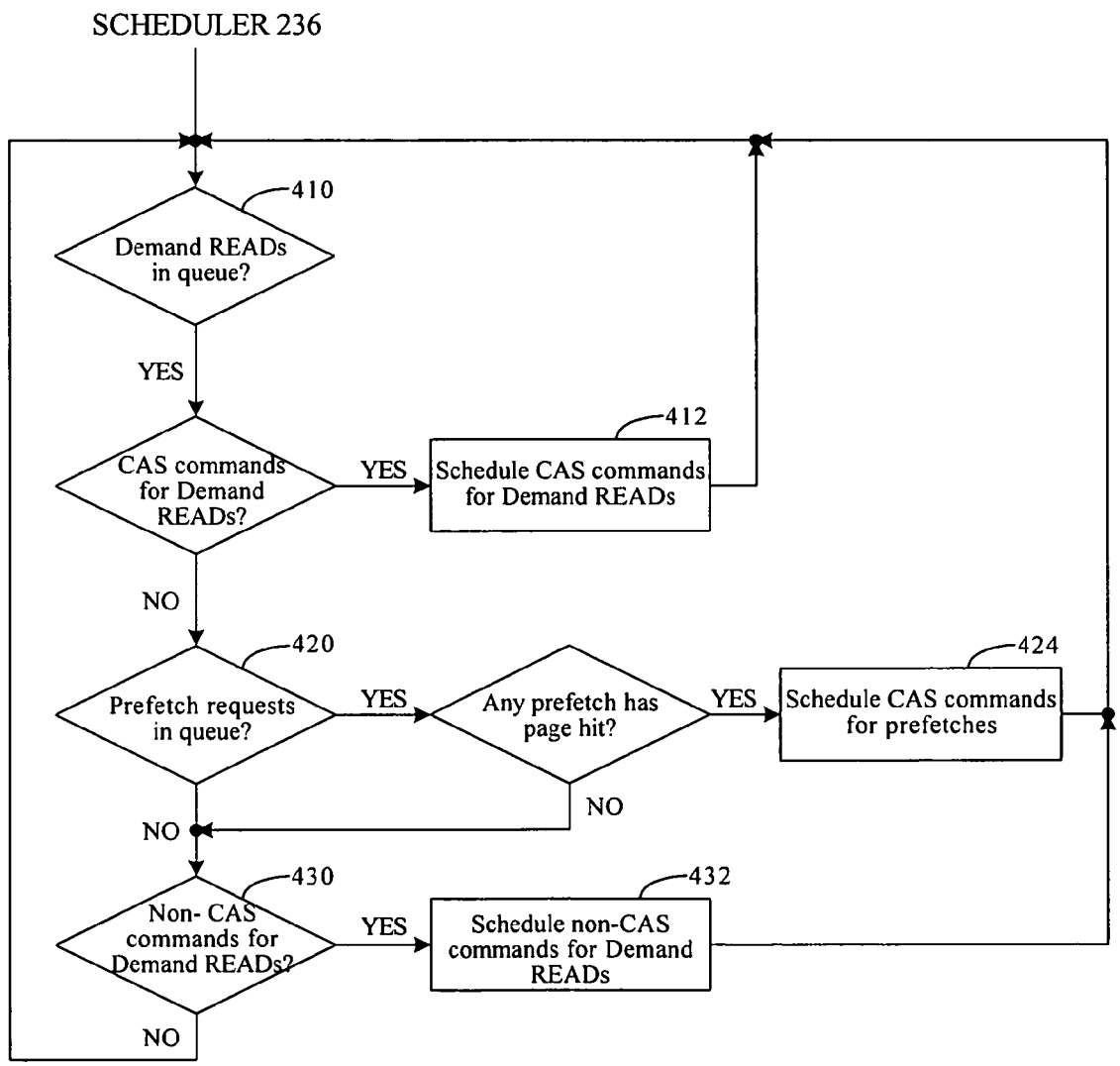
FIG. 3 illustrates a scheduling algorithm according to one embodiment of the invention.

For best performance, in one embodiment, the scheduling algorithm of the scheduler 236 in the channel 230 prioritizes prefetch and demand READs as illustrated in FIG. 3. Column address strobe (CAS) commands for non-prefetch READs get higher priority over prefetch CAS commands, and prefetch CAS commands get higher priority over non-CAS commands for non-prefetch READs. If there are demand READ requests in the queue (block 410), then CAS commands for these demand READ requests are scheduled in block 412. When no CAS commands for demand READ requests are to be scheduled, then the scheduler 236 checks whether there are prefetch CAS commands in block 420. The prefetches in the queue only have CAS commands, since only prefetches to open pages are accepted. Only prefetches that are page hits are scheduled in block 424. When no CAS commands for demand READ requests or prefetch CAS commands are to be scheduled, then the scheduler 236 then checks whether there are non-CAS commands for demand READ requests in block 430. If present, then PRECHARGE or ACTIVATE commands are scheduled in block 432. Any suitable algorithm may be used to schedule between PRECHARGE and ACTIVATE commands for READs to improve efficiency of DRAM access.

As previously mentioned, the DRAM-state aware prefetcher 200 monitors the efficiency of prediction and prefetching by monitoring the hit rate of the prefetches injected. The prefetcher 200 also throttles the future number of prefetches injected based on the prefetch hit rate and, possibly, memory bandwidth utilization, to prevent adverse effects on applications for which prefetching is not working efficiently. To determine the prefetch buffer hit ratio (PBHR), a prefetch buffer hit ratio module 280 (FIG. 1) is updated on READ hits. The PBHR is expressed as a percentage of prefetches issued that are hit by subsequent READs in the prefetch buffer 260 over a preselected interval. The prefetcher 200 dynamically adjusts prefetch injection based on the PBHR. That is, the prefetch injection aggressiveness (i.e., the number of prefetches that can be injected for a stream) is controlled by a distance metric that depends on PBHR. The stream tracker table 300 (FIG. 2) maintains information regarding the distance (number of cache lines) between the last prefetch injected and the last READ request received. This is maintained with offsets (from the page address boundary) per stream, corresponding to the injected prefetches and READ requests.

In another embodiment, the memory bandwidth utilization (MBU) rate may be a useful heuristic. To determine the MBU rate, the number of requests sent to memory is monitored over a time interval. The prefetcher 200 dynamically adjusts prefetch injection based on the MBU rate: if the MBU rate is above a threshold value, then the number of prefetches injected may be reduced.

Having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention as defined by the appended claims.

What is claimed is:

1. A method of prefetching from a memory device having interleaved channels, comprising:
    tracking the state of a plurality of streams;
    detecting a stride on one of the plurality of streams;
    selecting the stream with the stride for prefetch injection;
    enqueueing prefetches from the selected stream;
    mapping the prefetches to each of the interleaved channels;
    injecting the prefetches from the selected stream into each of the interleaved channels, wherein injecting the prefetches comprises inserting and keeping the prefetches in a prefetch queue in each channel until scheduled onto the memory device or until replaced by another prefetch, and further wherein the oldest injected prefetch stored in the prefetch queue that is not a page hit is replaced if the channel prefetch queue is full; and
    scheduling the prefetches onto the memory device in a DRAM-state aware manner.

2. The method of claim 1, wherein the state of the plurality of streams is tracked in a round-robin manner.

3. The method of claim 1, wherein the stride in the stream is detected by keeping a history of accesses in a stream tracker table.

4. The method of claim 1, wherein the replaced prefetch is not re-inserted.

5. The method of claim 1, further comprising:
    determining a prefetch buffer hit rate (PBHR) over a time interval; and
    adjusting the number of prefetches based on a predetermined PBHR level.

6. The method of claim 1, further comprising;
determining a memory bandwidth utilization (MBU) rate over a time interval; and
adjusting the number of prefetches based on a predetermined MBU rate.

7. The method of claim 1, wherein the method is performed by a chipset prefetcher.

8. A method of prefetching from a memory device having interleaved channels, comprising:
receiving a demand READ request from a source;
detecting a stride in a stream of the demand READ request;
mapping the address of the demand READ request to the channels of the memory device;
injecting the demand READ request into the channel of the memory device;
scheduling the demand READ request onto the memory device, wherein scheduling the demand READ request includes,
if demand READs are in a read queue, then scheduling CAS commands for demand READs;
if no demand READs are in the read queue and if prefetches are in a prefetch queue, then scheduling CAS commands for the prefetches in the prefetch queue that has a page hit; and
if no demand READs are in the read queue and no prefetch requests are in the prefetch queue, then scheduling non-CAS commands for demand READs in the read queue.

9. The method of claim 8, wherein the source comprises a central processing unit (CPU).

10. The method of claim 8, wherein the source comprises a graphics unit.

* * * * *

UNITED STATES PATENT AND TRADEMARK OFFICE
CERTIFICATE OF CORRECTION

| | |
|---|---|
| PATENT NO. | : 7,350,030 B2 |
| APPLICATION NO. | : 11/172401 |
| DATED | : March 25, 2008 |
| INVENTOR(S) | : Rotithor et al. |

It is certified that error appears in the above-identified patent and that said Letters Patent is hereby corrected as shown below:

On the title page item (56), under "Other Publications" in column 2, line 3, delete "Disrtributed" and insert -- Distributed --, therefor.

Signed and Sealed this

Fourth Day of November, 2008

JON W. DUDAS
*Director of the United States Patent and Trademark Office*